(12) United States Patent
Zeng et al.

(10) Patent No.: US 7,761,049 B2
(45) Date of Patent: Jul. 20, 2010

(54) DISTRIBUTED ARRAY RECEPTION

(75) Inventors: Dongsong Zeng, Germantown, MD (US); John B McKitterick, Columbia, MD (US); James A Freebersyser, Chanhassen, MN (US)

(73) Assignee: Honeywell International Inc., Morristown, NJ (US)

( * ) Notice: Subject to any disclaimer, the term of this patent is extended or adjusted under 35 U.S.C. 154(b) by 705 days.

(21) Appl. No.: 11/422,530

(22) Filed: Jun. 6, 2006

(65) Prior Publication Data
US 2007/0280151 A1  Dec. 6, 2007

(51) Int. Cl.
*H04B 3/36* (2006.01)
(52) U.S. Cl. .................. 455/7; 455/11.1; 455/13.1; 370/252; 370/254; 370/328; 370/338
(58) Field of Classification Search .............. 455/7, 455/11.1, 13.1, 502; 370/252, 254, 328, 370/338
See application file for complete search history.

(56) References Cited

U.S. PATENT DOCUMENTS

| 5,894,473 A * | 4/1999 | Dent ..................... 370/342 |
| 6,442,405 B1 | 8/2002 | Hiramatsu et al. |
| 2005/0014464 A1* | 1/2005 | Larsson .................. 455/11.1 |
| 2006/0050655 A1* | 3/2006 | Shi et al. ................. 370/254 |
| 2006/0062283 A1* | 3/2006 | Zhang et al. ............... 375/147 |
| 2006/0120433 A1* | 6/2006 | Baker et al. ............... 375/130 |

* cited by examiner

*Primary Examiner*—Nick Corsaro
*Assistant Examiner*—Amanuel Lebassi
(74) *Attorney, Agent, or Firm*—Fogg & Powers LLC

(57) ABSTRACT

A communication system is provided. The communication system comprises a remote transmitter, at least one central unit, and M number of nodes distributed in a coverage area to form a distributed array antenna in order to receive signals from the at least one remote transmitter and retransmit the received signals to the at least one central unit such that when combined the retransmitted signals form a composite signal with a signal-to-noise ratio (SNR) array gain of approximately M and the time to receive the retransmitted signals at the at least one central unit is increased by an inflation rate of approximately M or less.

11 Claims, 6 Drawing Sheets

DISTRIBUTED ARRAY RECEPTION

BACKGROUND

Multiple antenna elements may be used together to form an array antenna. The array antenna radiation pattern can be derived from the location information and the radiation patterns of the individual antenna elements. The array antenna has evolved from a linear array in which elements are aligned in a straight line, to a planar array in which elements are placed in a plane, to conformal arrays in which elements are placed on a non-planar surface such as the skin of an airplane, to distributed arrays in which elements are randomly distributed over a relatively wide range and each element may also have transmitting and receiving capabilities.

The distributed array has great advantages for the interconnection of energy-limited and massively distributed devices, such as an unattended ground sensors (UGS) network. The UGS are typically deployed at a distance, remote from the users who are receiving the sensor information. Communication between an external command station and the UGS can be accomplished with a satellite link. However, a satellite link is expensive both in power and size. However, using the UGS to transmit and receive in the fashion of a distributed array antenna can increase the distance between an external command station and the UGS network without the penalties of power consumption and size that a satellite communication link imposes. However, typical approaches for forming a virtual distributed array using the UGS nodes do not account for the information exchange growth due to representing data digitally, the local bandwidth limitations, and the energy impact on battery operated nodes.

For example, in a typical approach, each node receives a signal from the remote command station and then retransmits a digital representation of the received spread spectrum signal to the local central unit. This approach suffers from information exchange growth. In particular, the number of bits needed for the re-transmitted signal per bit of actual message is typically b=C×S×B×2, where C is the number of chips per bit, S is the digital sample rate, and B is the number of digital bits required to maintain sufficient dynamic range. The factor of two is required to send both I and Q. Typical values of C, S, and B are 128 chips/bit, 4 samples/chip, and 16 bits/sample, respectively. If each node transmits a signal of this length, the inflation rate ($I_R$) is $$I_R = 2 \times C \times S \times B \times M \times \frac{R_R}{R_L},$$

where M is the total number of nodes, $R_R$ is the data rate of the remote channel (i.e. the channel between the remote transmitter and the nodes) and $R_L$ is the data rate of the local digital channel (i.e. the channel between the nodes and a central unit). The factor M is included because the nodes transmit one at a time so as not to interfere with each other. Assuming the typical values mentioned above, and a local data rate 10 times faster than the remote data rate, the inflation rate is 1638.4×M. In other words, if the original message length is one second and 10 nodes are used, the time to receive the message is greater than 4 hours! This is not only an impractical time limitation, it also greatly reduces battery life since the longer the nodes are receiving and transmitting, the more battery is used up.

Therefore, for the reasons stated above, and for other reasons stated below which will become apparent to those skilled in the art upon reading and understanding the present specification, there is a need in the art for a distributed array antenna which reduces the inflation rate of time to receive a message without a substantial increase in the power requirement.

SUMMARY

The above-mentioned problems and other problems are resolved by the present invention and will be understood by reading and studying the following specification.

In one embodiment, a communication system is provided. The communication system comprises a remote transmitter, at least one central unit, and M number of nodes distributed in a coverage area to form a distributed array antenna in order to receive signals from the at least one remote transmitter and retransmit the received signals to the at least one central unit such that when combined the retransmitted signals form a composite signal with a signal-to-noise ratio (SNR) array gain of approximately M and the time to receive the retransmitted signals at the at least one central unit is increased by an inflation rate of approximately M or less.

In another embodiment, a method of communicating a signal with a distributed array antenna is provided. The method comprises transmitting the signal from a remote transmitter, receiving the signal at a plurality of M nodes which form the distributed array antenna, retransmitting the received signal from each of the M nodes, wherein each of the M nodes is adapted to retransmit the received signal such that the array gain is approximately M and the inflation rate is approximately M or less, and receiving the retransmitted signals at a central unit.

In another embodiment, a node is provided. The node comprises a receiver adapted to receive a signal; a logic circuit coupled to the receiver and adapted to process the received signal in order to retransmit the received signal such that the retransmitted signal is combinable with the retransmitted signals from other nodes to form a composite signal with a signal-to-noise ratio (SNR) gain near M and the time to receive the combined retransmitted signals at a central unit is increased by an inflation rate near or below M, and a transmitter coupled to the logic circuit for retransmitting the signal according to instructions from the logic circuit.

DRAWINGS

The present invention can be more easily understood and further advantages and uses thereof more readily apparent, when considered in view of the description of the embodiments and the following figures in which.

Like reference numbers and designations in the various drawings indicate like elements.

DETAILED DESCRIPTION

Figure 1:
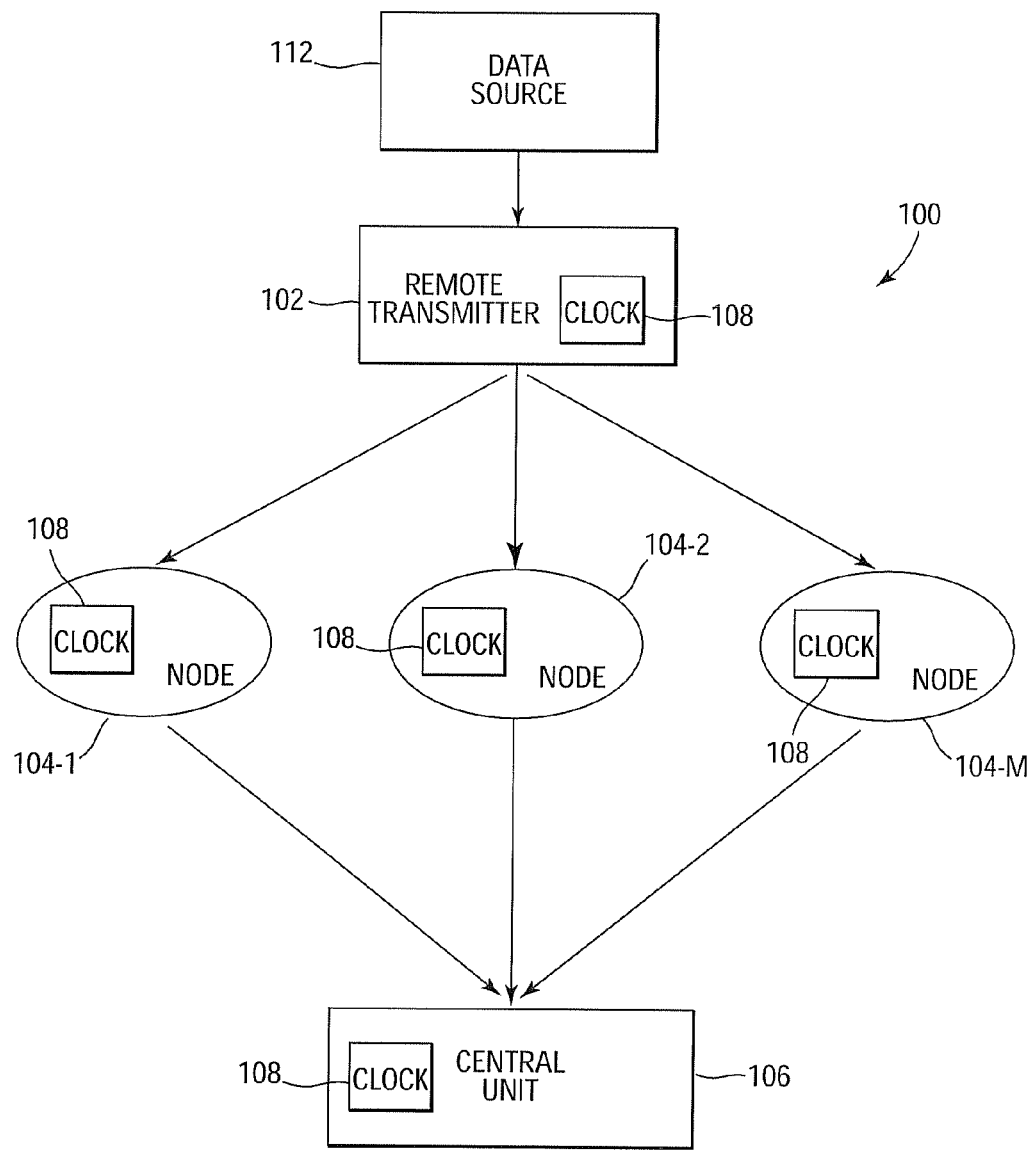
FIG. 1 is a high-level block diagram of a communication system with a distributed array according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary methods illustrated may include additional or fewer steps or may be performed in the context of a larger processing scheme. Furthermore, the methods presented in the drawing figures or the specification are not to be construed as limiting the order in which the individual steps may be performed. The following detailed description is, therefore, not to be taken in a limiting sense.

Embodiments of the present invention significantly reduce the inflation rate associated with transmitting a signal in a communication system with a plurality of nodes. This reduction in inflation rate is achieved through various methods described below. In addition, embodiments of the present invention enable an array gain of approximately M to be achieved through the methods described below, where M is a factor equal to the total number of nodes. Hence, embodiments of the present invention reduce battery consumption and enable practical transmission times.

FIG. 1 is a high-level block diagram of a communication system 100 with a distributed array according to one embodiment of the present invention. Communication system 100, in this example embodiment, includes at least one remote transmitter 102, at least one central unit 106, and nodes 104-1 . . . 104-M, where M is the total number of nodes. The term central unit, as used herein, refers to a final destination unit for a transmitted signal. For example, a central unit may be a final unattended ground sensor (UGS) unit to receive the transmitted signal. Remote transmitter 102 is adapted to receive messages from data source 112, and modulate and send signals comprising the original messages from data source 112. In this example, data source 112 is a base station transmitting commands, via remote transmitter 102, to unattended ground sensors. Nodes 104-1 . . . 104-M, in this example, are UGS near the central unit and far from the remote transmitter.

Nodes 104-1 . . . 104-M are distributed in a coverage area forming an array antenna to receive the signals transmitted from remote transmitter 102 and then retransmit the received signals to central unit 106 where the retransmitted signals from nodes 104-1 . . . 104-M are combined. Nodes 104-1 . . . 104-M are adapted to retransmit the signals as analog signals such that the retransmitted signals combine substantially coherently to form a composite signal having a signal-to-noise ratio (SNR) increased by a factor of approximately M over the SNR of individual retransmitted signals (i.e. the SNR array gain factor is approximately M). The array gain is accomplished by substantially combining the M signals coherently while non-coherently adding the noise on each signal. Since each signal travels a different path, the noise introduced on each signal will be different than the noise introduced on other signals. The noise, therefore, combines substantially non-coherently. Each signal however, is substantially the same as the other signals with the phase of each signal adjusted so that the signals combine substantially coherently. This combination is what produces the array gain factor of approximately M.

In addition, nodes 104-1 . . . 104-M are adapted to retransmit the signals such that the inflation rate is also approximately M. The inflation rate is defined as the ratio of the length of time for a message to be sent and assembled at the central unit to the length of time for the original message to be sent. In other words, the increase in transmission time due to nodes 104-1 . . . 104-M is a factor of approximately M, again where M is the total number of nodes. By enabling an array gain factor near M while maintaining the inflation rate also near or below M, embodiments of the present invention improve over other methods of obtaining an array gain near M.

In this example, the retransmitted signals are sent as analog rather than digital signals. This reduces the additional bandwidth needed for each signal allowing the retransmitted signals to be sent in near real time since the bandwidth needed for each signal is reduced. Additionally, since nodes 104-1 . . . 104-M retransmit substantially simultaneously rather than one at a time, there is essentially no delay associated with using M nodes versus 1 node. Therefore, the inflation rate is near or below M in this example.

Alternatively, in other embodiments, the signals are retransmitted as analog signals one at a time. The inflation rate is still maintained near M since analog retransmission does not suffer from the same information exchange growth associated with digital retransmission, as discussed above. Also, the gain is still near M since the analog signals are combined by central unit 106. In another alternative embodiment, the signals are retransmitted one at a time as digital signals. However, the digital signals in this alternative embodiment are processed such that the needed bandwidth is substantially reduced for each signal compared to the bandwidth needed for each signal in prior implementations, as described above. An exemplary method of processing and retransmitting the digital signals is described in more detail below.

In operation, data source 112 sends a message to remote transmitter 102. For example, in this embodiment, data source 112 is the remote base station controlling the UGS array, and the message is a new command for the array. Remote transmitter 102 modulates and transmits a signal containing the message. In some embodiments, the remote transmitter and data source are located in the same physical device. For example, in one embodiment, each of nodes 104-1 . . . 104-M are unattended ground sensors each with a data source and transmitter. Each UGS has the capability to transmit messages to other UGS nodes and to receive and retransmit signals from other UGS, as described below.

Nodes 104-1 . . . 104-M receive the signal from remote transmitter 102 and then retransmit the signal to central unit 106. In this example, nodes 104-1 . . . 104-M retransmit the signal substantially simultaneously as an analog signal such that each retransmitted signal combines in the air with the retransmitted signal from the other nodes prior to reaching central unit 106. Nodes 104-1 . . . 104-M adjust the phase of the retransmitted signal to account for differences in path length between each of nodes 104-1 . . . 104-M and central unit 106. In this way, the retransmitted signals combine substantially coherently. In addition, the inflation rate is near or below M as described above. In particular, the inflation rate is near 2 in this example.

Additionally, in this example, each of nodes 104-1 . . . 104-M, remote transmitter 102 and central unit 106 have a sufficiently accurate clock 108 to stabilize the respective local oscillator (LO) in each for at least the duration of the message. Having a sufficiently accurate clock 108, enables the frequency in each to be matched once during a training period and remain synchronized for the duration of the message. In this embodiment, clock 108 is a chip-scale atomic clock. A chip-scale atomic clock can improve the frequency stability of the LO to as much as 0.01 parts per billion (ppb). This corresponds to a percentage of frequency deviation of $10^{-9}$%. For example, if the carrier frequency is 300 MHz and the baseband is 1 MHz, the chip-scale atomic clock can maintain synchrony of the LO for approximately 83 seconds. The synchronization overhead is relatively small when using a sufficiently accurate clock 108, such as a chip-scale atomic clock.

Figure 2:
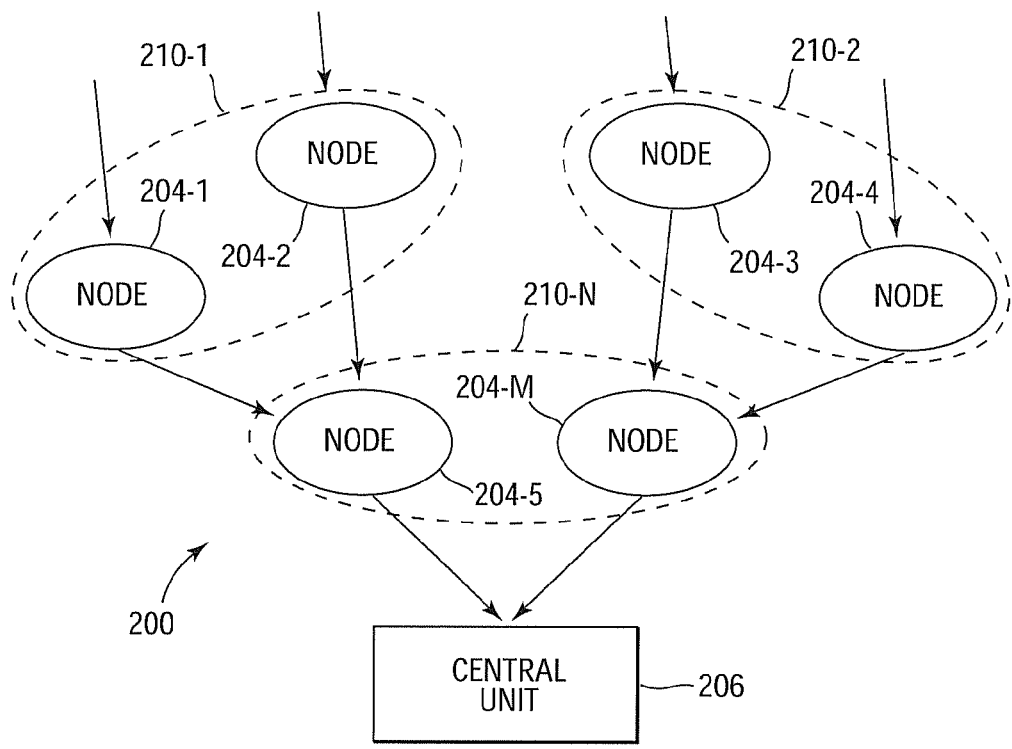
FIG. 2 is a high-level block diagram of a communication system with a distributed array according to another embodiment of the present invention.

FIG. 2 is a high-level block diagram of a communication system 200 with a distributed array according to another embodiment of the present invention. Communication system 200 is an alternative configuration of nodes 204-1 . . . 204-M, where M is the total number of nodes. In the example in FIG. 2, nodes 204-1 and 204-2 retransmit signals received from a remote transmitter, such as remote transmitter 102, to node 204-5 rather than directly to central unit 206. Similarly nodes 204-3 and 204-4 retransmit to node 204-M. Then nodes 204-5 and 204-M retransmit to central unit 206. This configuration, also referred to as multi-hopping, enables a greater range for communication system 200 by extending the distance between a remote transmitter and central unit 206 through multiple stages or hops. In addition, the inflation rate in this example remains less than M even when using multi-hopping since the signals received from upstream nodes (e.g. nodes 204-1 and 204-2) are combined at intermediate nodes (e.g. nodes 204-5 and 204-M) which means that each of the M nodes only retransmits once. Notably, although only 2 upstream nodes retransmit to an intermediate node (e.g. 204-1 and 204-2 retransmit to 204-5), the present invention is not intended to be so limited, and any appropriate number of upstream nodes can be used to transmit to an intermediate node. Similarly, although only one hop is shown in FIG. 2, it is to be understood that, in other embodiments, any appropriate number of hops are used.

In operation, nodes 204-1-204-4 each receive a signal transmitted from a remote transmitter, such as remote transmitter 102. Nodes 204-1 and 204-2 then retransmit the signal to node 204-5 and nodes 204-3 and 204-4 retransmit the signal to node 204-M. In one embodiment, each of nodes 204-1 . . . 204-M retransmit one at a time. In such embodiments, intermediate nodes 204-5 and 204-M align and sum the retransmitted signals received from nodes 204-1 . . . 204-4, respectively, and then retransmit the combined signals to central unit 206 one at a time. Central unit 206 aligns and sums the signals received from intermediate nodes 204-5 and 204-M to form a composite signal having array gain near M.

In an alternative embodiment, nodes 204-1 and 204-2 are members of subset 210-1; nodes 204-3 and 204-4 are members of subset 210-2; and nodes 204-5 and 204-M are members of subset 210-N, where N is the total number of subsets. In this alternative embodiment, the nodes of each subset retransmit the signal as an analog signal substantially simultaneously, one subset at a time. In other words, in this alternative example, nodes 204-1 and 204-2 (subset 210-1) retransmit substantially simultaneously. After subset 210-1, nodes 204-3 and 204-4 (subset 210-2) retransmit substantially simultaneously. In this way, the analog signals, adjusted for phase differences due to differences in distance, of nodes 204-1 and 204-2 combine substantially coherently during transmission such that node 204-5 receives, as one signal, a combined analog signal. Similarly, the retransmitted signals from nodes 204-3 and 204-4 combine substantially coherently prior to being received by node 204-M. After nodes 204-5 and 204-M have each received their respective combined signals, nodes 204-5 and 204-M (subset 210-N) retransmit analog signals substantially simultaneously such that the signals from 204-5 and 204-M combine substantially coherently prior to being received by central unit 206. In this way central unit 206 receives a composite signal having array gain near M. This alternative also reduces the inflation rate since two or more nodes (i.e. nodes in a subset) are transmitting simultaneously. Also, processing of received signals is reduced since each intermediate node (e.g. nodes 204-5 and 204-M) and central unit 206 each receive a combined signal rather than individual signals which must then be aligned and summed.

Figure 3:
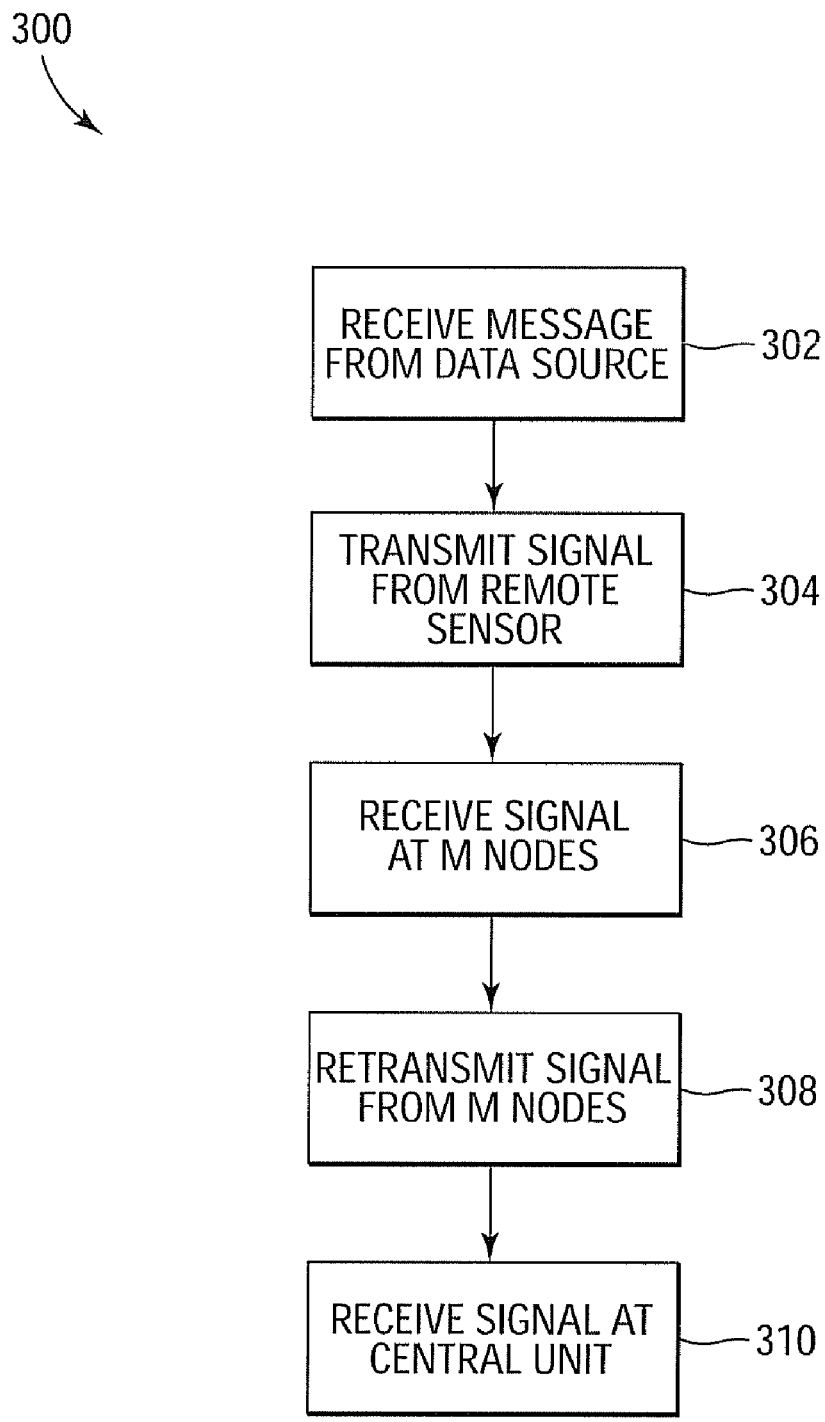
FIG. 3 is a flow chart of a method of communicating a signal with a distributed array antenna according to one embodiment of the present invention.

FIG. 3 is a flow chart of a method 300 of communicating a signal using a distributed array antenna according to one embodiment of the present invention. Method 300 is used in a communication system such as communication systems 100 and 200 discussed above. At 302, a message is received at a remote transmitter, such as remote transmitter 102, from a data source, such as data source 112. In some embodiments, the data source is a remote base station controlling the UGS array. In addition, in some embodiments, the remote transmitter and data source are located in the same physical device.

At 304, a signal is transmitted from a remote transmitter. In some embodiments, the signal transmitted from the remote transmitter is prepended with a training sequence of a series of chips. The training sequence is used to accurately align the internal clock of a receiver with the incoming signal transmitted by the remote transmitter. The length of the chips in the training sequence is sufficient to synchronize the internal clock of a receiver. For example, in one embodiment, the length of each chip is determined by first selecting a chip length, C, which, if received at M nodes and combined, would have a sufficient SNR to properly detect the chip. The chip length, C, is then increased by M, the total number of nodes, (i.e. chip length MC). This chip length, MC, provides a gain at each individual receiver which is substantially equivalent to the SNR achieved by combining a signal with chip length, C, received at M receivers. Therefore, the chip length, MC, enables each node to properly detect the desired signal. Additionally, in this example, the chip sequence is a series of chips with alternating equal-length groups of ones and zeros arranged so that the length of the groups is halved in each subsequent chip. An example of such a chip sequence is shown below:

0000000011111111
0000111100001111
0011001100110011
0101010101010101

An appropriate number of chips for the above chip sequence to be effective is $\log_2(MC)$ due to the fact that each subsequent chip halves the length of groups. However, it is to be understood, that, in other embodiments, other chip sequences and/or numbers of chips are used.

At 306, the signal is received at a plurality of M nodes. In some embodiments, the signal is received directly at each of the M nodes. In other embodiments, receiving the signal at the plurality of M nodes comprises receiving the signal directly at one or more upstream nodes, such as node 204a, and indirectly at intermediate nodes, such as node 204*e*. At 308, the signal is retransmitted from the M nodes to a central unit, such as central unit 206. In embodiments where the signal is received directly from the remote transmitter at each of the M nodes, the signal is retransmitted from each of the M nodes directly to the central unit. Alternatively, where the signal is received directly from the remote transmitter at one or more upstream nodes and indirectly at one or more intermediate nodes, retransmitting the signal comprises retransmitting the signal from the one or more upstream nodes to one or more intermediate nodes, referred to as a hop. In some embodiments, one hop is used and, in others, more than one hop is used in which the one or more intermediate nodes retransmit the signal to other intermediate nodes further downstream, and so on until the signal has been transmitted to the last intermediate nodes from all the other nodes. The last intermediate nodes to receive the signal, such as nodes 204*e* and 204*m* in FIG. 2 retransmit the signal directly to the central unit. In some embodiments using hops, the intermediate nodes are adapted to combine the signals received and retransmit one combined signal.

Various methods of retransmitting the signal from the M nodes are described in more detail below with regards to FIGS. 4-7. In each of the embodiments described below, the M nodes are adapted to retransmit the signal such that, when combined at the central unit, the retransmitted signals form a composite signal with a signal-to-noise ratio (SNR) array gain near M and the time to receive the retransmitted signals at the central unit is increased by an inflation rate near or below M. At 310, the retransmitted signals are received at a central unit, such as central unit 106. In some embodiments, the central unit is adapted to align and sum the retransmitted signals. In other embodiments, the central unit receives, as one signal, the sum of the individual nodes' retransmitted signals.

Figure 4:
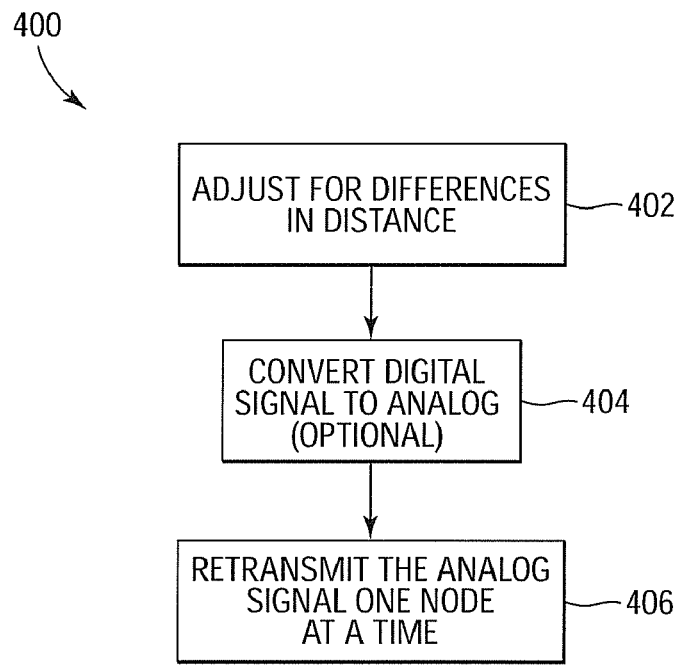
FIG. 4 is a flow chart of a method of retransmitting signals from a distributed array antenna according to one embodiment of the present invention.

FIG. 4 is a flow chart of a method 400 of retransmitting signals from a distributed array antenna according to one embodiment of the present invention. At 402, a signal received at the M nodes from a remote transmitter, such as remote transmitter 102, is adjusted at each node for differences in path length from the remote transmitter to each node. In addition, the signal is adjusted for differences in path length from each node to a central unit, such as central unit 106. In some embodiments, the differences in path length are accounted for by use of a training sequence prepended to the beginning of transmitted signals (i.e. the signal from the remote transmitter and the retransmitted signal from each of the M nodes), as described above. The prepended training sequence enables the synchronization of the internal clock of a receiving node to the internal clock of the transmitting node. In this way, each node and the central unit know when the data signal begins and can synchronize its internal clock with the remote clock in the remote transmitter and M nodes, respectively. In other embodiments, the differences in path length are accounted for by adding a phase shift to the signal based on known differences in distance between the remote transmitter and each of the M nodes and between each of the M nodes and the central unit. Additionally, in some embodiments, an atomic clock is used in the remote transmitter, M nodes and central unit to stabilize the local oscillator in each.

At 404, the signal received from the remote transmitter is converted from a digital signal to an analog signal at each of the M nodes. This conversion is only done if the signal received from the remote transmitter is a digital signal. If the signal received is an analog signal, no conversion is performed. At 406, each of the M nodes retransmits the analog signal one node at a time. The central unit is adapted in this example to store each of the received analog signals, align the signals, and sum the analog signals. In addition, the central unit is adapted to convert the summed analog signal to a digital signal, in some embodiments. Hence, in this example, the array gain near M is achieved by combining the analog signals. In this way, noise will add substantially incoherently, leaving the combined signal with array gain near M. Hence, the length of the signal transmitted from the remote transmitter and the signals retransmitted from the M nodes is reduced because additional bits are not needed to overcome noise. The reduction in signal length maintains the inflation rate near M since the original message length does not need to be significantly increased. Notably, although method 400 is described in terms of a configuration with no hops, it is to be understood that a similar process occurs between upstream and intermediate nodes in configurations with one or more hops.

Figure 5:
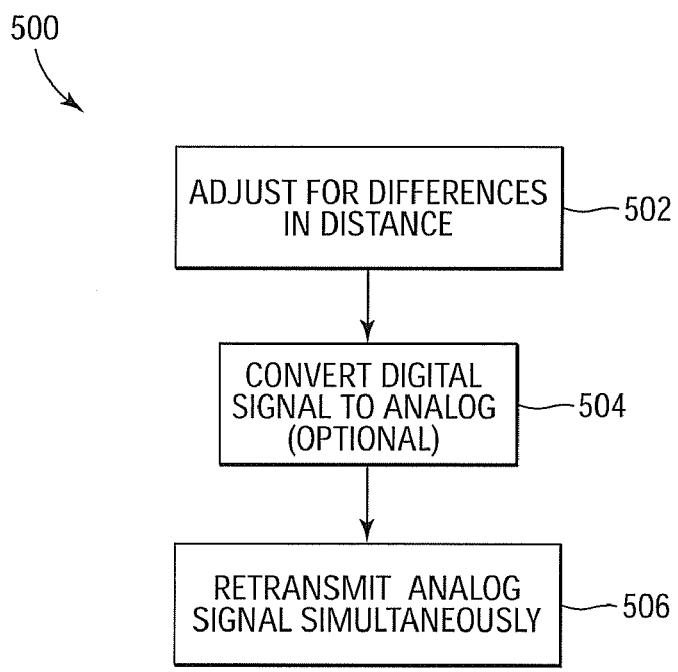
FIG. 5 is a flow chart of a method of retransmitting signals from a distributed array antenna according to one embodiment of the present invention.

FIG. 5 is a flow chart of a method 500 of retransmitting signals from a distributed array antenna according to one embodiment of the present invention. At 502, a signal transmitted from a remote transmitter, such as remote transmitter 102, is adjusted to compensate for differences in path length from the remote transmitter to each of M nodes. In some embodiments, the differences in path length between the remote transmitter and each of the M nodes are accounted for by use of a training sequence. The training sequence, in such embodiments, is prepended to the beginning of the transmitted signal by the remote transmitter, as described above, thereby allowing the receiving node to synchronize its clock with the remote transmitter's clock. In other embodiments, a phase shift is added by each node to the signal received from the remote transmitter. The phase shift compensates for differences in distance based on known differences in distance between the remote transmitter and each of the M nodes.

In addition, the received signal is adjusted by each node for differences in path length from each node to a central unit, such as central unit 106. To compensate for differences in path length from each node to the central unit, a phase shift is added to the signal based on known differences in distance between each of the M nodes and the central unit. Additionally, in some embodiments, an atomic clock is used in the remote transmitter, M nodes and central unit to stabilize the local oscillator in each.

At 504, the signal received from the remote transmitter is converted from a digital signal to an analog signal at each of the M nodes. This conversion is only done if the signal received from the remote transmitter is a digital signal. If the signal received is an analog signal, no conversion is performed. At 506, the analog signal from each node is transmitted substantially simultaneously. In this example embodiment, the M nodes retransmit the analog signals substantially simultaneously on a second channel different from the channel on which the remote transmitter transmits. In this way, the analog signals combine during transmission and the central unit receives, as one signal, the sum of the individual nodes' retransmitted signals. In some embodiments, the central unit is adapted to convert the summed analog signal to a digital signal. Hence, in this example, the array gain near M is achieved by combining the analog signals during transmission, which also reduces processing time and power at the central unit. In this way, noise will add substantially incoherently, leaving the combined signal with an array gain near M. Hence, the length of the signal transmitted from the remote transmitter and the signals retransmitted from the M nodes is reduced because additional bits are not needed to overcome noise. The reduction in signal length maintains the inflation rate below M since the original message length does not need to be significantly increased and the M nodes transmit substantially simultaneously.

Figure 6:
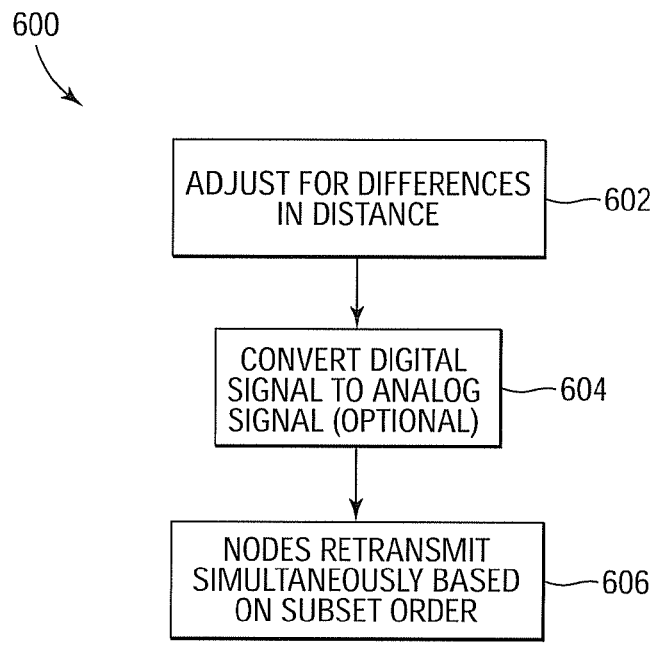
FIG. 6 is a flow chart of a method of retransmitting signals from a distributed array antenna according to one embodiment of the present invention.

FIG. 6 is a flow chart of a method 600 of retransmitting signals from a distributed array antenna according to one embodiment of the present invention. At 602, a signal transmitted from a remote transmitter, such as remote transmitter 102, is adjusted to compensate for differences in path length from the remote transmitter to each of one or more upstream nodes which receive the signal directly from the remote transmitter, such as nodes 204a and 204b. In some embodiments, the differences in path length between the remote transmitter and each of the upstream nodes are accounted for by use of a training sequence. The training sequence, in such embodiments, is prepended to the beginning of the transmitted signal by the remote transmitter, as described above, thereby allowing the upstream nodes to synchronize their clock with the remote transmitter's clock. In other embodiments, the one or more upstream nodes adjust for differences in path length from the remote transmitter to each upstream node by adding a phase shift to the signal received at each upstream node.

In addition, the signal from the remote transmitter is received indirectly at one or more intermediate nodes, such as nodes 204e and 204m, via the one or more upstream nodes. The one or more upstream nodes adjust for differences in distance between the one or more upstream nodes and the one or more intermediate nodes by adding a phase shift to the signal. Similarly, the one or more intermediate nodes adjusts for the differences in distance between the one or more intermediate nodes and downstream intermediate nodes or a central unit, such as central unit 206, by adding a phase shift to the signal based on known differences in distance. Additionally, in some embodiments, an atomic clock is used in the remote transmitter, M nodes and central unit to stabilize the local oscillator in each.

At 604, the signal received from the remote transmitter is converted from a digital signal to an analog signal at each of the M nodes. This conversion is only done if the signal received at each of the M nodes is a digital signal. If the signal received is an analog signal, no conversion is performed. At 606, each of the M nodes retransmits the analog signal based on the subset to which each node belongs. Each node is assigned to one of N subsets, such as subsets 210a, 210b and 210n. The nodes retransmit the signal, one subset at a time. When a particular subset is to transmit, the analog signal from each node in the subset is transmitted substantially simultaneously. In this example embodiment, the analog signals are retransmitted substantially simultaneously on a second channel different from the channel on which the remote transmitter transmits. In this way, the analog signals combine during transmission. Hence, each intermediate node receives, as one signal, the sum of the retransmitted signals sent to that intermediate node. In turn, the central unit receives, as one signal, the sum of the retransmitted signals sent from the subset containing the last intermediate nodes. In some embodiments, the central unit is adapted to convert the summed analog signal to a digital signal.

Hence, in this example, the array gain near M is achieved by combining the analog signals during transmission, which also reduces processing time and power at the central unit. In this way, noise will add substantially incoherently, leaving the combined signal with an array gain near M. Hence, the length of the signal transmitted from the remote transmitter and the signals retransmitted from the M nodes is reduced because additional bits are not needed to overcome noise. The reduction in signal length maintains the inflation rate below M since the original message length does not need to be significantly increased and the M nodes transmit substantially simultaneously in N subsets.

Figure 7:
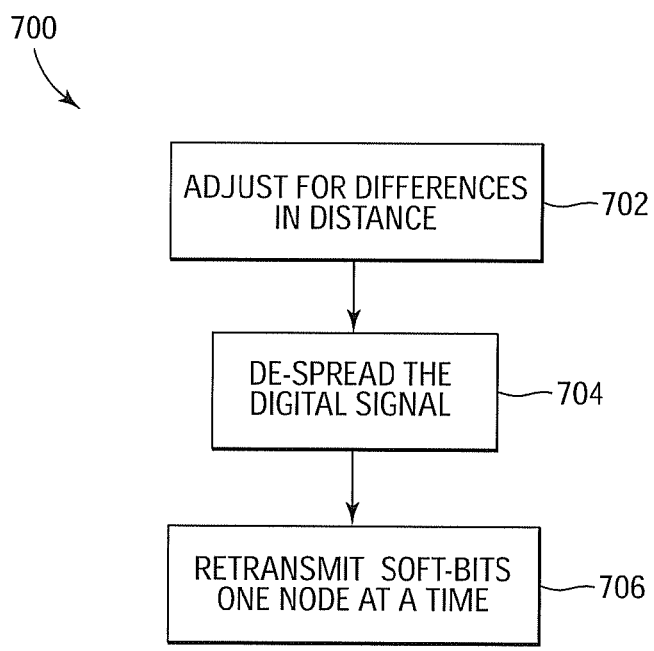
FIG. 7 is a flow chart of a method of retransmitting signals from a distributed array antenna according to one embodiment of the present invention.

FIG. 7 is a flow chart of a method 700 of retransmitting signals from a distributed array antenna according to one embodiment of the present invention. At 702, a signal received at the M nodes from a remote transmitter, such as remote transmitter 102, is adjusted at each node for differences in path length from the remote transmitter to each node. In some embodiments, the differences in path length are adjusted by use of a training sequence prepended to the beginning of transmitted signals (i.e. the signal from the remote transmitter and the retransmitted signal from each of the M nodes), as described above. The prepended training sequence synchronizes the internal clock of the nodes and central unit to incoming signals. In this way, each node and the central unit knows when the data signal begins and is synchronized with the remote clock in the remote transmitter and M nodes, respectively. Additionally, in some embodiments, an atomic clock is used in the remote transmitter, M nodes and central unit to stabilize the local oscillator in each.

At 704, the digital signal received from the remote transmitter is de-spread at each of the nodes. De-spreading the digital signal constitutes analyzing the digital spread signal received to obtain soft-bits representing bits in the original message received at the remote transmitter from a data source, such as data source 112. At 706, each of the M nodes transmits the soft-bits, one at a time, to a central unit, such as central unit 106. The central unit is adapted to align and sum the soft-bits from the M nodes. Hence, the inflation rate is significantly reduced over other digital serial transmissions, such as described above. As described above with regards to prior distributed arrays, each node typically transmits the spread signal to the central unit which sums the spread signals and then de-spreads the summed signal. Reversal of the order of the summing and de-spreading enables embodiments of the present invention to reduce the length of each signal retransmitted. In particular, the inflation rate is reduced to:

$$I_R = 2 \times B_S \times M \times \frac{R_R}{R_L},$$

where $B_S$ is the number bits necessary for each soft-bit, $R_R$ is the remote data rate, and $R_L$ is the local data rate.

The bit length, $B_S$, depends on the SNR of the original signal, the number of chips per bit in the original signal, the number of receivers in the array, and the desired performance of the system. However, $B_S$ is of order $\log_2(M)$. Transmission of a one second long message in a digital serial configuration with 10 nodes and an inflation rate of 1638.4×M, as discussed above with regards to prior arrays, would take more than 4 hours. However, the time needed for transmission of the same one second long message in the same configuration using this exemplary embodiment of the present invention having an inflation rate of approximately M would be on the order of 7 seconds! Therefore, whereas a typical approach may obtain a gain of approximately M, it does so by drastically increasing the inflation rate above M. Embodiments of the present invention, however, obtain a gain of approximately M while maintaining the inflation rate also at approximately M. Notably, although method 700 is described in terms of a configuration with no hops, it is to be understood that a similar process occurs between upstream and intermediate nodes in configurations with one or more hops.

Figure 8:
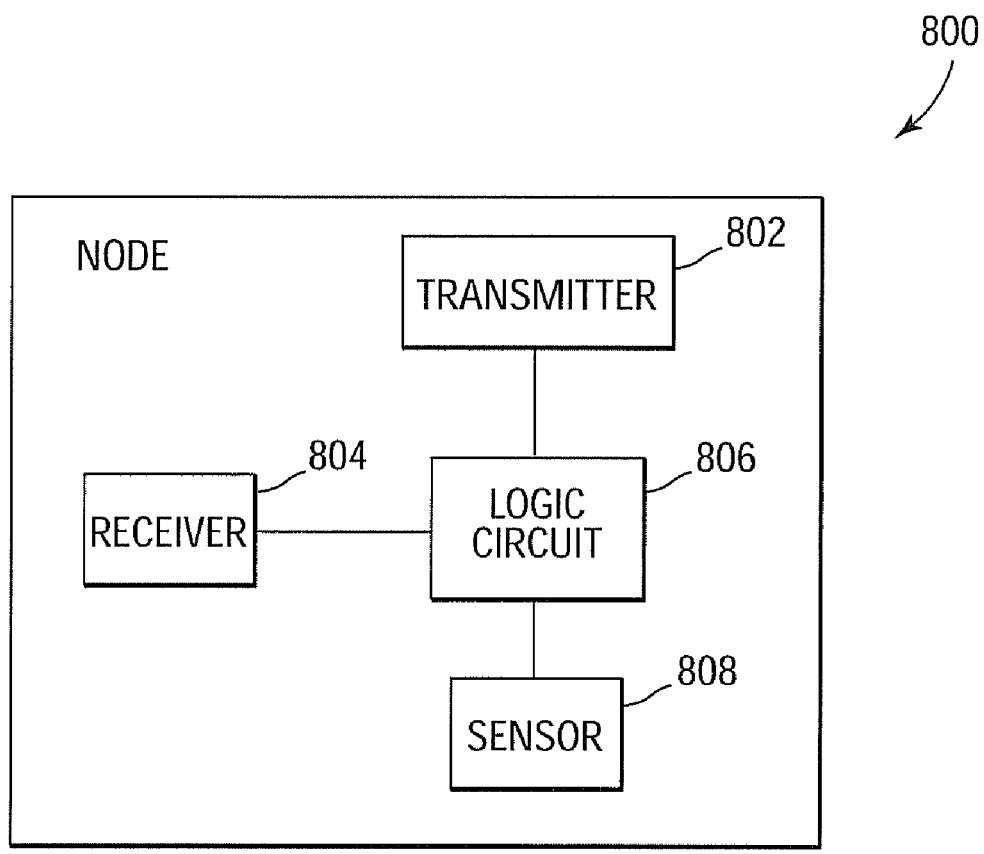
FIG. 8 is a high-level block diagram of a node according to one embodiment of the present invention.

FIG. 8 is a high-level block diagram of a node 800 according to one embodiment of the present invention. Node 800 includes a transmitter 802, a receiver 804 and a logic circuit 806. Receiver 804 is adapted to receive signals from a remote transmitter. Logic circuit 806 is coupled to receiver 804 and processes the received signals in order to retransmit the received signal such that the retransmitted signal is combinable with the retransmitted signals from other nodes to form a composite signal with a signal-to-noise ratio (SNR) gain near M and the time to receive the retransmitted signals at a central unit is increased by an inflation rate near or below M. Transmitter 802 is coupled to logic circuit 806 and adapted to retransmit the received signal according to instructions from logic circuit 806.

In some embodiments, node 800 is an unattended ground sensor and further includes sensor 808. Sensor 808 is coupled to logic circuit 806 and is adapted to detect activity in an area around the unattended ground sensor. In addition, transmitter 802 is adapted to transmit signals to other unattended ground sensors to relay signals indicating detection of activity.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communication system comprising:
   a remote transmitter;
   at least one central unit; and
   M number of nodes distributed in a coverage area to form a distributed array antenna in order to receive a signal from the at least one remote transmitter at each of the M nodes, wherein each of the M nodes is configured to de-spread the received signal from the at least one transmitter and to transmit soft-bits obtained from de-spreading the received signal to the at least one central unit; and
   wherein the at least one central unit is configured to align the transmitted soft-bits received from the M nodes and to combine the transmitted soft-bits to form a composite signal with a signal-to-noise ratio (SNR) array gain of approximately M and the time to receive the transmitted soft-bits at the at least one central unit is increased by an inflation rate of approximately M or less.

2. The communication system of claim 1, further comprising:
   an atomic clock in each of the at least one remote transmitter, the M nodes and the
   at least one central unit, the atomic clocks being adapted to stabilize the frequency of the remote transmitter, the local oscillator in each of the M nodes, and the local oscillator in the at least one central unit.

3. The communication system of claim 1, wherein the at least one remote transmitter and the M nodes are further adapted to prepend transmitted signals with a training sequence comprising a series of chips of sufficient length such that the M nodes and the at least one central unit are able to align their internal clocks to the received prepended signals.

4. The communication system of claim 3, wherein the at least one remote transmitter and the M nodes are further adapted to prepend transmitted signals with a training sequence comprised of a series of chips with alternating equal-length groups of ones and zeros arranged so that the length of the groups is halved in each subsequent chip.

5. A method of communicating a signal with a distributed array antenna, the method comprising:
   transmitting the signal from a remote transmitter;
   receiving the signal at a plurality of M nodes which form the distributed array antenna;
   de-spreading, at each of the M nodes, the signal received from the remote transmitter;
   obtaining soft-bits from the de-spread signal at each of the M nodes;
   transmitting, from each of the M nodes, the soft-bits obtained from de-spreading the received signal to the central unit;
   receiving the transmitted soft-bits at a central unit;
   aligning the received soft-bits at the central unit; and
   combining the received soft-bits to form a composite signal with a signal-to-noise ratio (SNR) array gain of approximately M and the time to receive the transmitted soft-bits at the central unit is increased by an inflation rate of approximately M or less.

6. The method of claim 5, further comprising:
   stabilizing a local oscillator in each of the remote transmitter, the M nodes, and the central unit with an atomic clock.

7. The method of claim 5, further comprising:
   prepending the signal transmitted from the remote transmitter with a training sequence comprised of a series of chips of sufficient length such that the M nodes are able to align their internal clocks to the prepended signal received from the remote transmitter.

8. The method of claim 5, further comprising:
   prepending the soft-bits transmitted from the M nodes with a training sequence comprised of a series of chips of sufficient length such that the central unit is able to align its internal clock to the prepended soft-bits received from the M nodes.

9. The method of claim 5, further comprising:
   prepending the signal transmitted from the remote transmitter and the soft-bits transmitted from the M nodes with a training sequence comprised of a series of chips with alternating equal-length groups of ones and zeros arranged so that the length of the groups is halved in each subsequent chip.

10. A node comprising:
    a receiver adapted to receive a signal;
    a logic circuit coupled to the receiver and adapted to process the received signal; and
    a transmitter coupled to the logic circuit for retransmitting the processed signal according to instructions from the logic circuit;
    wherein the logic circuit is configured to de-spread the received signal and to provide soft-bits obtained from de-spreading the received signal to the transmitter;
    wherein the transmitter is configured to transmit the soft-bits to a central unit that is configured to align the soft-bits with soft-bits from a plurality of other nodes and to combine the aligned soft-bits to form a composite signal with a signal-to-noise ratio (SNR) gain near M and the time to receive the transmitted soft-bits at the central unit is increased by an inflation rate near or below M.

11. The node of claim 10 wherein the node is an unattended ground sensor further comprising:
    at least one sensor coupled to the logic circuit, the at least one sensor being adapted to detect activity in an area around the unattended ground sensor, wherein the transmitter is adapted to transmit signals to other unattended ground sensors.

* * * * *